Nov. 13, 1951 L. W. ATCHISON 2,575,086
MAGNETIC VALVE
Filed Feb. 14, 1947
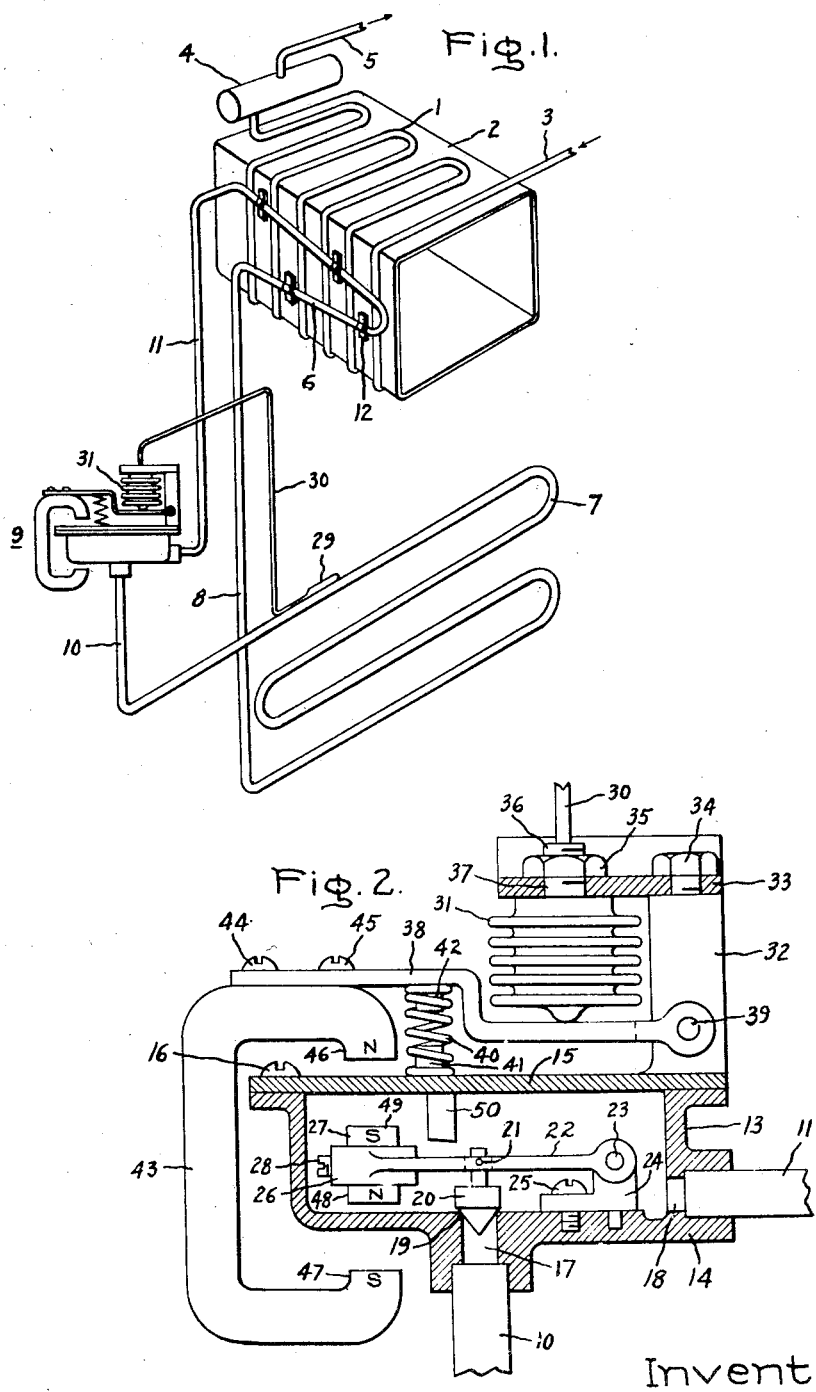
Inventor:
Leonard W. Atchison,
by Edwin L. Rich
His Attorney.

Patented Nov. 13, 1951

2,575,086

UNITED STATES PATENT OFFICE 2,575,086

MAGNETIC VALVE

Leonard W. Atchison, Erie, Pa., assignor to General Electric Company, a corporation of New York Application February 14, 1947, Serial No. 728,571

3 Claims. (Cl. 137—139)

My invention relates to fluid control valves and more particularly to valves in which magnetic attraction is employed for operation.

In closed fluid systems including a valve for controlling the flow of fluid the movement of the valve may be controlled by a bellows or diaphragm mounted within the valve housing, the bellows or diaphragm being placed in communication with some condition-responsive device, such as a thermostatic bulb, located outside the closed system. Such an arrangement is frequently employed, for example, in closed refrigerating systems, and it becomes necessary to seal the bellows carefully to prevent leakage of refrigerant. The necessity for this additional precaution against leakage can be avoided by mounting the valve entirely within the closed valve housing and placing the bellows or other movable element for controlling the movement of the valve outside the housing. By this arrangement the normal sealing of the valve housing prevents the leakage of refrigerant and it is unnecessary to provide an additional seal for moving parts which govern the operation of the valve.

It is also sometimes desirable to provide a fluid flow controlling valve which has only two operating positions, a completely open and a completely closed position. In other words, the valve is arranged to move with a snap action from the open to the closed position and vice versa and cannot remain in an intermediate or throttling position. Again by way of example, it has been found desirable in some cases to provide such snap-acting valves in refrigeration systems in order that a range of cabinet temperatures extending above and below 32° F. may be secured for operation on a defrosting cycle. This makes possible a high relative humidity without allowing the humidity to become excessively high.

It is an object of my invention to provide a magnetic valve including an improved arrangement for actuating a valve element within a closed housing.

It is a further object of my invention to provide a magnetic valve including an improved arrangement for causing the valve to operate with a snap action between its open and closed positions.

Further objects and advantages of my invention will become apparent as the following description proceeds and the features of novelty which characterize my invention will be pointed out with particularity in the claims annexed to and forming a part of this specification.

By my invention, I provide cooperating magnets, one of which is located within the valve housing and the other of which is placed outside the valve housing. The attraction between the magnets is employed to open and close the valve with a snap action, and any direct connection between the valve within the closed housing and the movable elements outside the housing is rendered unnecessary.

For a better understanding of my invention reference may be had to the accompanying drawing in which Fig. 1 is a diagrammatic view of a refrigerant system including a control valve embodying my invention; and Fig. 2 is an enlarged sectional view showing details of the valve.

Referring now to the drawing, I have shown in Fig. 1 a refrigerating system including a primary and a secondary system. The primary system includes an evaporator 1 which may be brazed or otherwise suitably bonded to a shell 2. Liquid refrigerant is supplied to the evaporator 1 from any suitable condensing apparatus (not shown) through a conduit 3, and vaporized refrigerant is withdrawn by the condensing apparatus from the header 4 through a conduit 5.

A closed secondary system is provided including an upper or condenser portion 6 and a lower or evaporator portion 7. Liquid refrigerant is supplied from the secondary condenser 6 to the secondary evaporator 7 through a conduit 8. In order to control the flow of vaporized refrigerant in the secondary system and hence to control the temperature of the evaporator 7, a valve 9 is provided in the vapor return line between the evaporator 7 and the condenser 6. Communication between the secondary condenser and the valve is provided by a conduit 10 and communication between the valve and the secondary condenser is provided by a conduit 11. In order to maintain the primary evaporator 1 and the secondary condenser 6 in heat exchange relationship, the secondary condenser is secured to the shell 2 by clamps 12 or by any other suitable fastening arrangement.

Referring now to Fig. 2, the valve 9 includes a housing 13 composed of a lower bowl-shaped portion 14 and a cover 15. The cover is secured to the lower portion by screws, one of which is indicated by 16, or by any other suitable securing arrangement. If desired, a gasket may be included between the portions 14 and 15 to insure a satisfactory seal therebetween. The lower portion 14 is provided with a passage 17 to which the conduit 10 is connected and a passage 18 to which the conduit 11 is connected, in order to provide a path through the housing 13 for the flow of refrigerant. At the upper end of the passage 17 a valve seat 19 is provided with which a valve or flow-controlling element 20 cooperates to govern the flow of refrigerant. In order to provide for the movement of the element 20 between its open and closed positions this element is hinged at 21 to a valve operating member or arm 22, which is pivoted at 23 to a bracket 24. The bracket is secured to the lower portion 14 of the housing by a screw 25 or by any other suitable fastening device. At its free end the arm 22 includes a boss 26 for the reception of an elongated magnet 27. In order to retain the magnet 27 in position within the boss 26 a set screw 28 is provided. This arrangement for mounting the magnet affords a vertical adjustment of the magnet relative to the arm 22. As can be seen from Fig. 2 the element 20, the arm 22 to which it is hinged, and the magnet 27 are all mounted within the closed housing 13, and these parts have no mechanical connection with the elements external of the housing which will now be described.

A thermostatic or feeler bulb 29 is placed in contact with the upper portion of the secondary evaporator 7 in order to be responsive to the temperature of this evaporator and the bulb is connected by means of a tube 30 to an expansible member or bellows 31 so that changes in pressure produced by temperature changes at the bulb are transmitted to the bellows. In order to mount the bellows 31 in proper operating relationship with the remaining elements of the valve 9, the cover 15 of the housing is provided with an upwardly extending bracket 32. The bellows 31 is fixed to a horizontal support 33, which is fastened to the top of the bracket 32 by a bolt 34, or by any other suitable fastening device. In order to secure the bellows 31 on the support 33 a nut 35 is threaded to a portion 36 of the bellows which extends upwardly through an opening 37 in the support. The bracket 32 is also utilized for the mounting of a movable arm 38, which is pivoted at 39 to the bracket 32. The bellows 31 is arranged to bear against the arm 38. A coiled compression spring 40 mounted between pins 41 and 42 on the cover 15 and arm 38, respectively, opposes the force of the bellows 31. In order to actuate the valve 20, a magnet 43 is mounted at the end of the arm 38 by screws 44, 45 or by any other suitable securing devices. The magnet 43 is of generally C-shape, having its opposite poles 46, 47 at the inwardly extending ends of the C. The magnet 43 and the previously described magnet 27 are so arranged that the magnet 27 is positioned between the poles of the magnet 43 within the open portion of the C with the axis of the elongated magnet 27 in line with the poles 46, 47 of the C-shaped magnet 43. Further, the two magnets are arranged so that the attracting poles are adjacent each other. As shown in Fig. 2 the magnet 43 has its north pole 46 at the upper portion and its south pole 47 at the lower portion. The magnet 27 is mounted on the arm 22 with its north pole 48 at the lower end and its south pole 49 at the upper end. Thus the south pole of the magnet 27 is adjacent the north pole of magnet 43 and the north pole of magnet 27 is adjacent the south pole of magnet 43. In order that magnet 43 may exert the requisite magnetic attraction on the magnet 27, the housing 13, or at least the portion located between the two magnets, is made of nonmagnetic material. A stop 50, which is brazed or otherwise secured to the cover 15 is provided for limiting the upward movement of the arm 22 to prevent the magnet 27 striking the cover.

The valve operates in the following manner. In Fig. 2 the valve is shown in its closed position wherein the flow of vaporized refrigerant from the secondary evaporator 7 to the secondary condenser 6 is prevented. This condition occurs when the temperature of the secondary evaporator, as indicated by the bulb 29, is below its predetermined maximum. As the temperature of the evaporator 7 rises, the increase in temperature causes an expansion of the bellows 31 and a corresponding downward movement of the movable arm 38 against the opposition of the spring 40. This causes a downward movement of the magnet 43 and brings the north pole 46 of this magnet closer to the south pole 49 of the magnet 27. At the same time this downward movement causes the south pole 47 of magnet 43 to recede from the north pole 48 of magnet 27. Therefore the attraction between the upper pair of poles 46, 49 is progressively increased and the attraction between the lower pair of poles 47, 48 is progressively decreased. At some point in the movement of the magnet 43, which corresponds to the predetermined maximum temperature of the secondary evaporator 7, the attraction between the upper pair of poles exceeds the attraction between the lower pair of poles and the arm 22 moves upwardly as the magnet 27 is attracted toward the pole 46 of magnet 43. As the magnet 27 moves upwardly the distance between its south pole 49 and the attracting north pole 46 of the magnet 43 is reduced, thereby further increasing the attractive force between these poles. At the same time the distance between the lower pair of poles 47, 48 is increased, thereby reducing the attractive force between this pair of poles. Since the attracting force varies as the second power of distance between the poles, this cumulative effect results in the shifting of the magnet 27 with a snap action from its extreme lower position to its extreme upper position. Thus, because of the arrangement of the magnets, the arm 22 cannot remain in equilibrium in an intermediate position which would result in a throttling position of the flow-controlling element 20, since as soon as the valve begins to move from its closed position, shown in Fig. 2, the forces causing the movement progressively increase as the valve moves and cause the valve to shift with a snap action to its completely open position. When the temperature of the secondary evaporator 7 has been reduced to its predetermined minimum the bellows 31 contracts and the spring 40 causes an upward movement of the movable arm 38 and of the magnet 43 mounted thereon. Under these conditions the reverse operation of the valve with a snap action from the completely open to the completely closed position occurs.

Although for purposes of illustration I have shown the valve in the vapor return line, it is apparent that the valve can also be located, if desired, in the liquid supply line for controlling the flow of liquid refrigerant. Further, although I have shown the valve in connection with a secondary refrigerating system, it is apparent that its use is not so limited and that it may be employed in other systems where it is desired to avoid direct connection between the flow-controlling element and the external controlling parts. Therefore, I intend in the appended claims to cover all modifications within the spirit and scope of my invention.

What I claim as new and desire to secure by Letters Patent of the United States, is:

1. A magnetic valve comprising a housing, an arm pivotally-secured to the exterior of said housing, a C-shaped magnet mounted on said arm, means engaging said arm for changing the position of said C-shaped magnet, a valve operating arm movably mounted within said housing, said housing having a valve seat therein, a valve element mounted on said valve operating arm and adapted to cooperate with said valve seat, said valve operating arm having an elongated magnet mounted thereon, said elongated magnet being disposed between the poles of said C-shaped magnet with the axis of said elongated magnet in line with the poles of said C-shaped magnet, said elongated magnet having each of its poles mounted adjacent and facing the pole of opposite polarity of said C-shaped magnet whereby as said C-shaped magnet is moved so that one pole thereof approaches the adjacent pole of said elongated magnet, the other pole of said C-shaped magnet moves away from the adjacent pole of said elongated magnet and said valve operating arm is moved with a snap action to open and close said valve.

2. A magnetic valve comprising a housing, a bracket secured to the exterior of said housing, an arm pivotally mounted on said bracket, a C-shaped magnet mounted on said arm, a valve operating arm movably mounted within said housing, said housing having a valve seat therein, a valve element mounted on said valve operating arm and adapted to cooperate with said valve seat, said valve operating arm having an elongated magnet mounted thereon, said elongated magnet being disposed between the poles of said C-shaped magnet with the axis of said elongated magnet in line with the poles of said C-shaped magnet, and means mounted on said bracket and arranged to engage said first-mentioned arm for changing the position of said C-shaped magnet to move one of said poles of said C-shaped magnet toward the pole of opposite polarity of said elongated magnet and simultaneously to move the other pole of said C-shaped magnet away from the other pole of said elongated magnet whereby said valve operating arm is moved with a snap action from one extreme position to the other.

3. A magnetic valve comprising a housing, a bracket secured to the exterior of said housing, an arm pivotally mounted on said bracket, a C-shaped magnet mounted on said arm, a spring mounted on said housing for biasing said arm in one direction, a valve operating arm movably mounted within said housing, said housing having a valve seat therein, a valve element mounted on said valve operating arm and adapted to cooperate with said valve seat, said valve operating arm having an elongated magnet mounted thereon, said elongated magnet being disposed between the poles of said C-shaped magnet with the axis of said elongated magnet in line with the poles of said C-shaped magnet, said elongated magnet having each of its poles disposed adjacent the pole of opposite polarity of said C-shaped magnet, and a bellows mounted on said bracket and arranged to engage said first-mentioned arm for moving said C-shaped magnet to shift one of said poles of said C-shaped magnet toward the pole of opposite polarity of said elongated magnet and simultaneously shift the other pole of said C-shaped magnet away from the other pole of said elongated magnet whereby said valve operating arm is moved with a snap action from one extreme position to another.

LEONARD W. ATCHISON.

REFERENCES CITED

The following references are of record in the file of this patent:

UNITED STATES PATENTS

| Number | Name | Date |
| --- | --- | --- |
| 1,954,148 | Smith | Apr. 10, 1934 |
| 2,062,674 | Pirwitz | Dec. 1, 1936 |
| 2,307,723 | Anderson | Jan. 5, 1943 |
| 2,310,357 | Edelman | Feb. 9, 1943 |
| 2,310,562 | Whittington | Feb. 9, 1943 |

FOREIGN PATENTS

| Number | Country | Date |
| --- | --- | --- |
| 107,177 | Australia | Apr. 12, 1939 |